3,132,893
DOORS AND THE LIKE FOR TRANSPORTATION VEHICLES
Theodore Z. Herr and Thorvald Madland, both of Chicago, Ill., assignors to The Youngstown Steel Door Company, Cleveland, Ohio, a corporation of Ohio
Filed Sept. 28, 1961, Ser. No. 141,335
1 Claim. (Cl. 296—106)

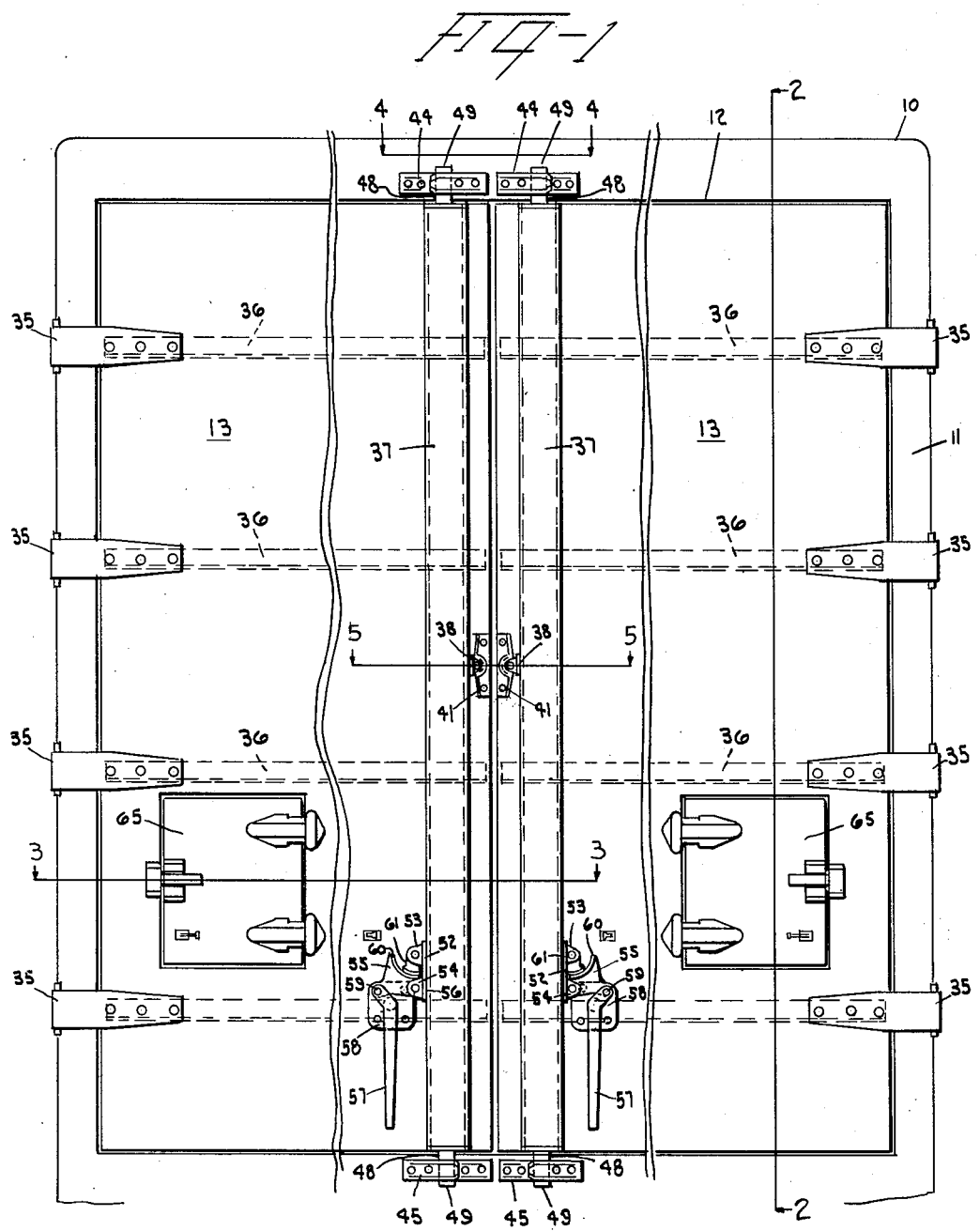

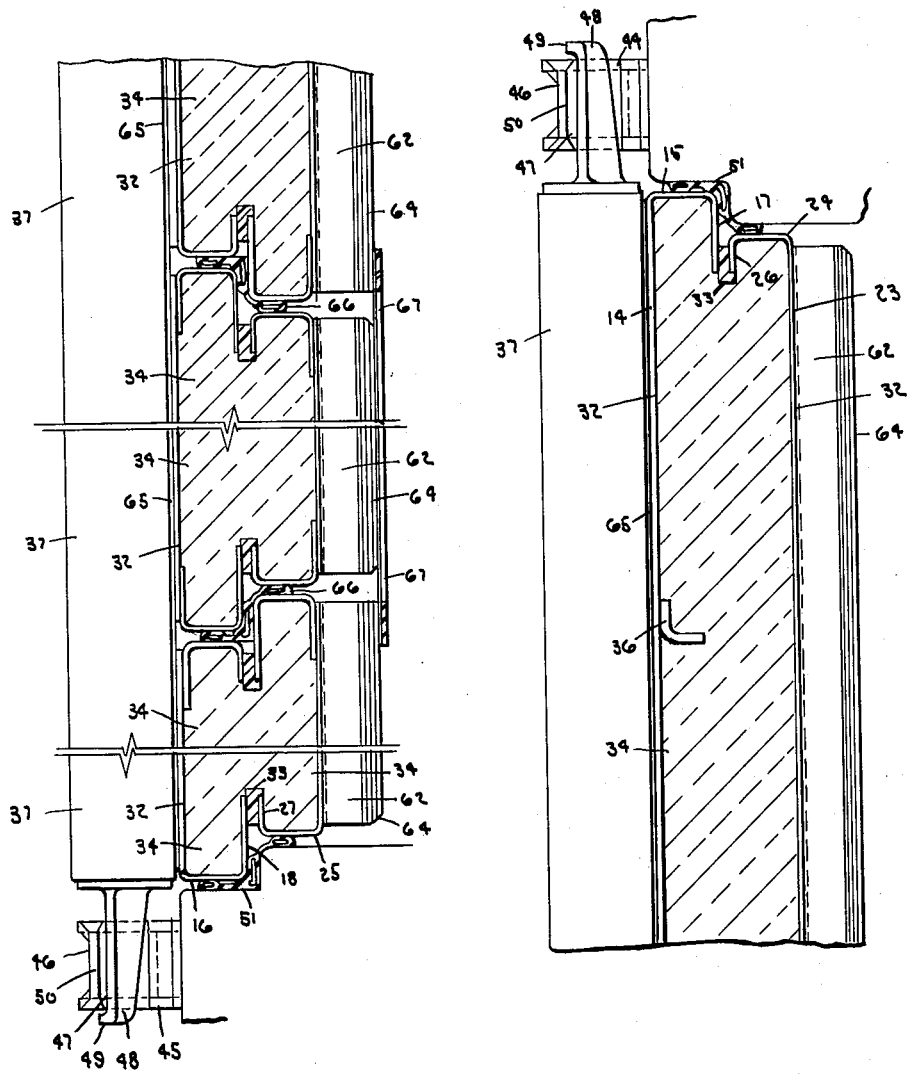

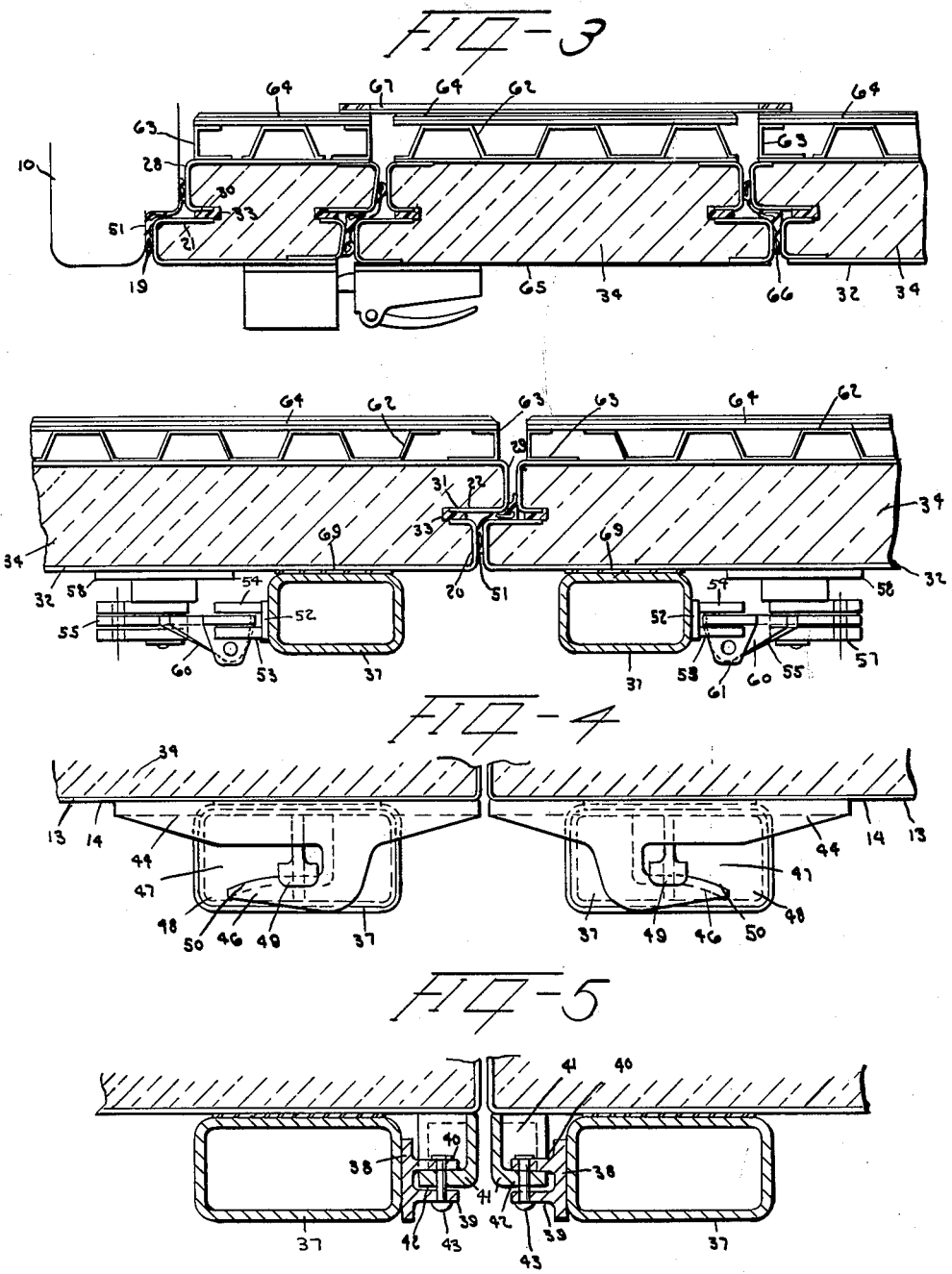

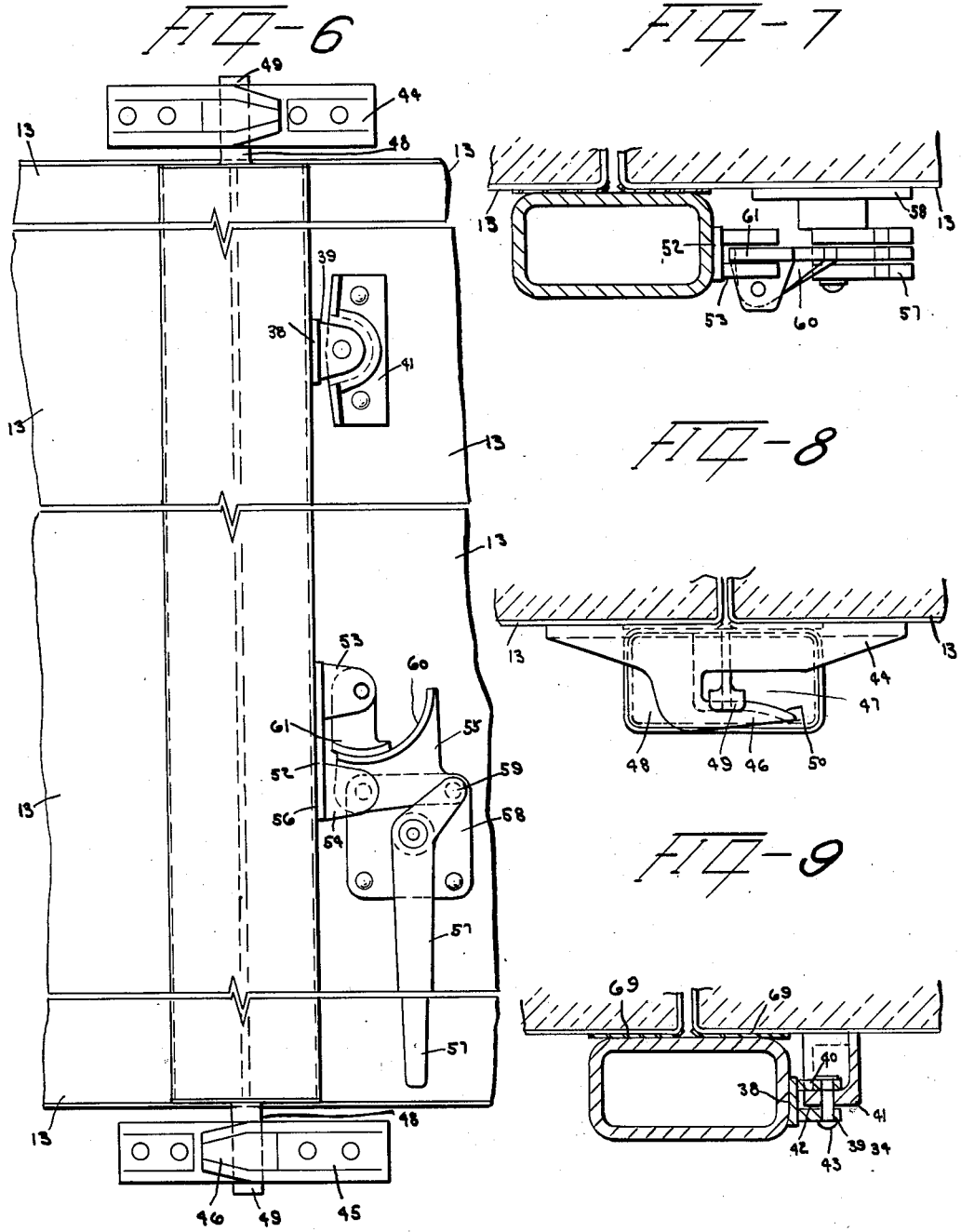

This invention relates to doors and the like for transportation vehicles and more particularly for refrigerator containers and highway trailers.

It is an object of this invention to provide doors and the like for transportation vehicles which shall comprise an intrinsically weak heat insulating core sandwiched between inner and outer skins wherein the core shall function as a stress-carrying member.

A further object is to provide strong stress-carrying doors and the like which shall comprise lightweight and inherently weak heat insulating cores sandwiched between inner and outer metallic skins.

A further object is to provide doors and the like of the character set forth immediately above which shall obviate the need for internal reinforcements.

A further object is to provide doors and the like for transportation vehicles which shall comprise an inherently weak lightweight heat insulating core sandwiched between inner and outer inherently weak skins and associated therewith in such a manner as to provide doors having high strength to weight ratios.

A further object to provide doors and the like for transportation vehicles which shall comprise an inherently weak lightweight heat insulating core sandwiched between inner and outer inherently weak skins wherein the core shall be subject only to direct compressive and shear loads and the skins shall carry tensile and compressive stresses.

A further object is to provide doors and the like for transportation vehicles which shall comprise an inherently weak lightweight heat insulating core completely enclosed within and bonded to an inherently weak skin.

A further object is to provide hinged doors for transportation vehicles and locking means therefor so constructed and associated with the doors as to be capable of carrying a substantial part of the load imposed on the doors and to permit the doors to be designed as a beam spanning the distance from the door hinges to the locking means.

A further object is to provide swinging doors for transportation vehicles and locking means therefor wherein the locking means are so constructed and related to the doors as to constitute an essential structural element of the doors.

Other objects of the invention will become clear as the description thereof proceeds.

In the drawings forming part of this specification:

FIG. 1 is an elevation of an end of a transportation vehicle to which a pair of doors embodying the instant invention is hinged.

FIG. 2 is a vertical section taken on line 2—2 of FIG. 1.

FIG. 3 is a horizontal section taken on line 3—3 of FIG. 1.

FIG. 4 is a top plan view of the door locking and load carrying means.

FIG. 5 is a horizontal section taken on line 5—5 of FIG. 1.

FIG. 6 is a partial elevation showing a single locking bar for both doors.

FIG. 7 is a horizontal section similar to FIG. 3.

FIG. 8 is a top plan view similar to FIG. 4.

FIG. 9 is a horizontal section similar to FIG. 5.

Referring to the drawings, the numeral 10 indicates generally an insulated transportation vehicle which may be in the form of a container, highway trailer or the like. The end 11 of the vehicle is open as indicated at 12. This opening is adapted to be closed by a pair of swinging doors 13, 13 which embody the instant invention. Since the construction of the doors 13, 13 is similar, the description of one of these doors will suffice for the other door.

As illustrated more particularly in FIGS. 2 and 3 of the drawings, each door 13 embodies an outer metallic skin 14 preferably formed of a lightweight metallic member such as aluminum. In the embodiment of the invention shown, the upper and lower portions of the skin 14 are flanged inwardly as indicated at 15 and 16 and then toward each other to provide flanges 17 and 18 which lie in spaced relationship to the main body of the skin 14. Similarly, the vertical portions of the skin 14 are flanged inwardly as indicated at 19 and 20 and then toward each other to provide flanges 21 and 22 which lie parallel to the body portion of the skin 14. In this manner the door is reinforced by integrally formed marginal channel-shaped sections. It will be understood, however, that if desired, channel-shaped marginal reinforcing members separate from and secured to the body of the skin 14 may be utilized instead.

Each door 13 also embodies an inner metallic skin 23 preferably formed of a lightweight metallic member such as aluminum. The upper and lower portions of the skin 23 are flanged outwardly as indicated at 24 and 25 and then toward each other to provide flanges 26 and 27 which lie in spaced relationship to the body of the skin 23. The vertical portions of the skin 23 are flanged outwardly as indicated at 28 and 29 and then toward each other as indicated at 30 and 31 so that the latter flanges lie in spaced relationship to the body of the skin 23. The construction described hereinabove provides channel-shaped reinforcements for the marginal portions of the door. In place of the integral construction of these marginal reinforcements separate channel-shaped reinforcing members may be employed which are secured to the skin 23 by means of screws, bolts or by adhesive.

Skins 14 and 23 are bonded together by means of an adhesive so as to provide a core receiving cavity 32. Skins 14 and 23 are accordingly arranged with the flanges 17 and 18 of the skin 14 disposed adjacent and in spaced relationship to the flanges 26 and 27 of the skin 23. Similarly, the flanges 21 and 22 of the outer skin 14 are disposed adjacent and in spaced relationship to the flanges 30 and 31 of the skin 23. To provide a thermal barrier between the two skins, a non-heat conducting breaker strip 33 is interposed between the indicated skin flanges. These flanges and the breaker strip are bonded together by means of an adhesive by the application of heat and pressure. A completely enclosed casing is thereby provided which is formed of thin lightweight material that is structurally intrinsically weak.

A core 34 is disposed within the casing provided by the skins 14 and 23. The core 34 is formed of polyurethane which is preferably foamed in place. Preformed foamed slabs of polyurethane may also be used. The skins 14 and 23 are preferably prepared for the introduction of the core by having their inner surfaces coated with an adhesive. The casing is placed within a form by which it is completely embraced so that its shape and dimensions are maintained during the foaming operation. The casing for this purpose is supported upon one vertical edge. An opening is provided in the opposite vertical edge through which the materials forming the core are introduced. Smaller spaced openings are provided in this edge whereby air and any gases which may be formed in the foaming operation may escape from the interior of the casing. After the core has been formed, these openings are closed in any desired manner. It has been found for the purpose of the instant invention that a polyurethane core which does not exceed 4 lbs. per cu. ft. in density and which has a K factor of 0.17 is satisfactory. This yields a core which is light in weight and provides the required thermal insulating value. The core adheres to the casing or the adhesive material with which the interior of the casing may be coated so that it becomes tenaciously bonded to the skins 14 and 23.

Standing alone, the polyurethane core has little, if any, structural value. The casing formed by the skins 14 and 23 is also relatively weak structurally. However, as a result of the instant invention a structural member is obtained which possesses great strength in relationship to its weight. In addition, it has substantial heat insulating value. When the described structure is subjected to a load as occurs when the lading within a vehicle shifts against doors embodying the structure, the inner and outer skins serve to carry the tensile and compressive stresses created by the load while the polyurethane core is subjected only to direct compressive stresses and shear. The strength resulting from the association of the elements entering into the described structure is such that additional reinforcing members are not required.

The doors 13, 13 are hinged as indicated at 35 to the transportation vehicle 10 in order to close the end door opening 12. In order to distribute local stresses inducted by the hinges, angle members 36, preferably formed of aluminum, are secured to the inner face of the outer skin 14 in any desired manner. The hinges 35 as clearly shown in FIG. 1 of the drawings are fastened to the skin 14 and to the angle members 36 by means of rivets or the like. Thus, stresses which would otherwise be concentrated are distributed along the angle members.

In the illustrated embodiment of the invention individual locking bars are employed to secure the free or swinging edges of the doors to the vehicle. The use of separate locking bars is preferred in some instances. However, in view of the overlapping relationship between the doors at their meeting edges as shown more clearly in FIG. 3 of the drawings, a single locking bar fastened to the overlapping door may be employed. Each of the locking bars 37, 37 is preferably in the form of a tubular member. It will be understood that other shapes may be utilized as well. A bracket 38 is secured to the locking bar in any desired manner. Ears 39 and 40 extend from the bracket 38. A bracket 41 is secured to the door adjacent to the locking bar as by means of rivets or the like. The bracket 41 is provided with an offset flange 42 which is received between the ears 39 and 40 of the bracket 38. A rivet 43 extends through the ears 39 and 40 and the offset flange 42 thereby pivotally mounting the locking bar upon the door bracket 41. As a result of this mounting, the locking bar 37 is capable of swinging movement in a plane parallel to the door.

Keepers 44 and 45 are secured to the transportation vehicle above and below the door opening 12. These keepers are provided with a locking flange 46 spaced from the main body of the keeper in order to provide a pocket 47 within which an extension 48 of the locking bar is received in order to lock the door in closed position.

Extensions 48 are secured to the upper and lower ends of the locking bar 37. The upper extension is flanged as indicated at 49 in order to overlap the upper keeper 44 when the door is in locked position. Similarly, the lower extension 48 is flanged as indicated at 49 so that it underlies the lower keeper 45. As a result of the indicated overlapping relationship between the extensions on the locking bar and the upper and lower keepers, vertical displacement of the locking bar relative to the vehicle is limited.

As is shown more clearly in FIG. 4 of the drawings, the inner face of the locking flange 46 of the keepers is tapered as indicated at 50. When the locking extensions engage the tapered portion of the flange 46 of the keepers as the locking bars are swung to locking position, the tapered portions serve to force the locking bars and, therefore, the doors on which they are mounted, into the door opening 12 against the resistance offered by peripheral gaskets 51 carried by the doors.

According to the instant invention, the locking bars serve as stress-carrying members capable of resisting substantially half of the total load imposed on the doors. In view of this construction, each of the doors becomes a beam, spanning the distance from its locking bar to the hinged edge of the door. Locking bars which do not offer structural strength throughout their length, as do the locking bars 37, require that each door functions as a flat panel which substantially affects both the design of the door and the loading of the vehicle. The locking bars accordingly serve as structural elements of the doors.

In order to obtain sufficient leverage to swing the locking bars to locked position against the resistance offered by the gaskets 51, a bracket 52 is secured to the lower portion of each of the locking bars. Each bracket carries pairs of vertically spaced ears 53 and 54. One end of a link 55 is pivotally secured as indicated at 56 between the spaced ears 54. An angular lever 57 is pivotally mounted upon a bracket 58 which is secured to the door. The upper end of the lever is pivotally secured as indicated at 59 to the end of the link 55. Lever 57 extends downwardly from its support upon the bracket 58 so as to be readily accessible for operation.

The upper surface of the link 55 is curved as indicated at 60 so that it is adapted to cooperate with a locking cam 61 pivotally mounted between the pair of ears 53. Engagement between the locking cam 61 and the curved surface 60 of the link 55 prevents actuation of the lever 57. The locking cam 61 and the curved surface 60 are provided with openings (not shown) which are aligned when the locking bar is in locking position so that a seal (not shown) may be passed through the openings.

When a flue is desired upon the inside of the doors, formed members of aluminum 62 and 63 are secured to the inner face of the door and a plywood or other lining 64 is fastened upon the members 62 and 63. This provides for continuous air circulation within the vehicle in the event that lading contacts the doors.

In order to provide ventilation for the vehicle when such commodities as lettuce and other products which must be cool but not frozen are carried while preventing pilferage thereof, each door 13 is provided with a small auxiliary hinged door 65. Each auxiliary door is similar in construction to the main doors 13, 13 as shown more particularly in FIGS. 2 and 3 of the drawings. Gaskets 66, similar to the gaskets 51 of the main door, are employed in order to seal the auxiliary doors in closed position. A member 62 is secured to the inner face of each of the auxiliary doors and cooperates therewith and with a lining 64 to provide a flue which is an extension of the flue provided on the main doors 13, 13. To prevent pilferage of the commodity in the vehicle when the auxiliary doors are open, a screen 67 is fastened to the flue lining 64 of the main doors so as to extend across the openings closed by the auxiliary doors.

In the embodiment of the invention illustrated in FIGS. 6 to 9 of the drawings a single locking bar 68 is employed to lock the overlapping edges of the doors 13, 13 to the transportation vehicle. The locking bar 68 is preferably of a width to span these edges of the doors. Brackets 38 and 41 are utilized to mount the locking bar upon the overlapping door for swinging movement in a plane parallel thereto as heretofore described. Extensions 48 are mounted on the ends of the locking bar and engage the keepers 44 and 45 to lock both doors. Actuation of the locking bar is accomplished by the hereinabove described mechanism identified by reference numerals 53 to 61. Whether single or double locking bars are used the doors are provided with rub plates 69 against which the locking bars bear.

It will be apparent that numerous changes and modifications in the details of the invention will be clear to those skilled in the art. It is intended, therefore, that all such modifications and changes be comprehended within this invention which is to be limited only by the scope of the claims appended hereto.

We claim:

In a transportation vehicle having a door opening, a pair of insulated doors swingably mounted on said vehicle for closing the door opening, the free ends of said doors being overlapped, each of said doors comprising an intrinsically structurally weak, lightweight, heat-insulating core, intrinsically structurally weak metallic skins bonded directly to the inner and outer faces of said core, means securing said skins together, said core carrying the horizontal shear stresses imposed on said doors by the load in the vehicle and said skins carrying the tensile and compressive stresses imposed on said doors by the load, at least one vertical locking bar for said doors pivotally mounted intermediate its length on one of said doors for swinging movement in a plane parallel to said door, keepers secured to said vehicle above and below the door opening, the ends of said locking bar engaging said keepers to lock said doors in closed position, said locking bar comprising a stress-carrying beam extending vertically along the free end of said one door capable of withstanding substantially one-half of the force imposed on said doors, and means for imparting swinging movement to said locking bar, said means comprising a lever pivotally mounted on said one door, a link pivotally secured to said lever and said locking bar, said link having a curved surface and a latch pivotally mounted on said locking bar, said latch having a curved surface cooperating with the curved surface of said link to prevent swinging movement of said link, said doors acting as simple beams under load.

References Cited in the file of this patent

UNITED STATES PATENTS

| | | |
|---|---|---|
| 1,737,627 | Wear | Dec. 3, 1929 |
| 2,071,236 | Pierce | Feb. 16, 1937 |
| 2,329,753 | Goulooze | Sept. 21, 1943 |
| 2,714,516 | Brown | Aug. 2, 1955 |
| 2,728,702 | Simon | Dec. 27, 1955 |
| 2,751,638 | Wallenbrock | June 26, 1956 |